US009316741B2

(12) United States Patent
Cheng et al.

(10) Patent No.: US 9,316,741 B2
(45) Date of Patent: Apr. 19, 2016

(54) SYSTEM AND METHOD FOR DETERMINING GPS RECEIVER POSITION

(71) Applicant: Marvell World Trade Ltd., St. Michael (BB)

(72) Inventors: Jian Cheng, Shanghai (CN); Zhi Wang, Shanghai (CN); Mohan Chen, Shanghai (CN); Zhike Jia, Fremont, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 470 days.

(21) Appl. No.: 13/900,126

(22) Filed: May 22, 2013

(65) Prior Publication Data

US 2013/0314277 A1 Nov. 28, 2013

Related U.S. Application Data

(60) Provisional application No. 61/651,868, filed on May 25, 2012.

(51) Int. Cl.
*G01S 19/42* (2010.01)
*G01S 19/43* (2010.01)

(52) U.S. Cl.
CPC *G01S 19/43* (2013.01); *G01S 19/42* (2013.01)

(58) Field of Classification Search
CPC ........... G01S 19/42; G01S 19/48; G01S 1/00; G01S 19/24
USPC .................................................... 342/357.25
See application file for complete search history.

(56) References Cited

U.S. PATENT DOCUMENTS 7,623,066 B2 11/2009 Geier et al.
7,924,220 B1 4/2011 Lennen et al.
2006/0055596 A1* 3/2006 Bryant ...................... G01S 5/10 342/357.64
2007/0216575 A1* 9/2007 DiEsposti ............. G01S 19/252 342/357.64
2007/0241958 A1* 10/2007 Nicholson ............... G01S 19/20 342/357.58
2012/0169542 A1* 7/2012 Mathews ................ G01S 5/021 342/450

* cited by examiner

*Primary Examiner* — Harry Liu

(57) ABSTRACT

Systems and methods for determining a position of a global positioning system (GPS) receiver are provided. A first satellite and a second satellite that have an unobstructed communication path to the GPS receiver are identified. For each of the first and second satellites, data received is used to determine a satellite position and a code phase for a transmitted satellite signal. A relative code phase is calculated between the transmitted satellite signals of the first satellite and the second satellite, where the relative code phase is a difference between the determined code phases. The position of the GPS receiver is determined based on the satellite positions of the first and second satellite and the relative code phase.

18 Claims, 4 Drawing Sheets

302 DETERMINE RECEIVER TIME ESTIMATION AND RECEIVER LOCATION ESTIMATION
304 DETERMINE VISIBLE SATELLITES AND RECEIVE CARRIER DOPPLER, CODE PHASE (SUB MS PART) AND C/No READING
306 CHECK AVAILABILITY OF EPHEMERIS FOR SATELLITES
308 FOR SATELLITES THAT HAVE BOTH EPHEMERIS AND CODE PHASE/DOPPLER MEASUREMENTS:
310 CALCULATE SATELLITE POSITION (Xs, Ys, Zs)
312 CALCULATE ESTIMATED PRE-POSITION RANGE
314 CALCULATE DIRECTION COSINE
316 CALCULATE SATELLITE CLOCK ERROR
318 CORRECT CODE PHASE WITH SATELLITE CLOCK ERROR
320 CALCULATE RELATIVE CODE PHASE
322 FIND BEST SATELLITE ACCORDING TO C/No AS THE BASE REFERENCE
324 CALCULATE ESTIMATED PRE-POSITION RANGE AND KEEP ONLY SUB MS PART
326 CONSTRUCT VECTOR $p_r$ AND DO MS ROLLOVER CHECK WHEN SATELLITE NUMBER IN VECTOR NOT LESS THAN 5
328 CONSTRUCT MATRIX $H_r$ WHEN SATELLITE NUMBER NOT LESS THAN 5
330 RESOLVE EQUATION: $H_r x = p_r$
REPEAT FOR SATELLITES
332 GET FINAL RESOLVED TIME AND RECEIVER LOCATION
300

100
102
104
106
108
110
112
114
116
118

SYSTEM AND METHOD FOR DETERMINING GPS RECEIVER POSITION

CROSS-REFERENCE TO RELATED APPLICATIONS

This disclosure claims priority to U.S. Provisional Patent Application No. 61/651,868, filed on May 25, 2012, which is incorporated herein by reference in its entirety.

TECHNICAL FIELD

The technology described in this document relates generally to a satellite positioning system and more particularly to determining a position of a global positioning system receiver without a fully-resolved satellite time.

BACKGROUND

The global positioning system (GPS) is a satellite-based navigation system built and operated by the United States Department of Defense. Civilian codes (C/A codes) in the L1 frequency band are freely accessible to anyone with a GPS receiver. GPS generally provides location and time information in all weather conditions, anywhere on or near the Earth where there is an unobstructed communication path to four or more GPS satellites. To provide the location and time information, the GPS system includes twenty-four or more satellites circling the Earth. The satellites are placed in six different orbits, such that at any time, a minimum of six and a maximum of more than eleven satellites are visible to nearly any GPS receiver on the surface of the Earth. A GPS receiver determines its position by computing relative times of arrival of signals transmitted simultaneously from the plurality of GPS satellites visible to the receiver. The satellites transmit, as part of their message, both satellite positioning data as well as data on satellite clock time (i.e., ephemeris data). The process of searching for and acquiring GPS signals, reading the ephemeris data for the plurality of GPS satellites, and computing the location of the receiver can be time consuming, often requiring thirty seconds or more in a cold start condition.

SUMMARY

The present disclosure is directed to systems and methods for determining a position of a global positioning system (GPS) receiver. In a method for determining a position of a global positioning system (GPS) receiver, a first satellite and a second satellite that have an unobstructed communication path to the GPS receiver are identified. For each of the first and second satellites, data received is used to determine a satellite position and a code phase for a transmitted satellite signal. A relative code phase is calculated between the transmitted satellite signals of the first satellite and the second satellite, where the relative code phase is a difference between the determined code phases. The position of the GPS receiver is determined based on the satellite positions of the first and second satellite and the relative code phase.

In another example, a system for determining a position of a global positioning system (GPS) receiver includes a processor and a computer-readable memory encoded with instructions for commanding the processor to execute steps. The steps include identifying a first satellite and a second satellite that have an unobstructed communication path to the GPS receiver. For each of the identified first and second satellites, received data is used to determine a satellite position and a code phase for a transmitted satellite signal. A relative code phase is calculated between the transmitted satellite signals of the first satellite and the second satellite, where the relative code phase is a difference between the determined code phases. The steps further include determining the position of the GPS receiver based on the satellite positions of the first and second satellites and the relative code phase.

DETAILED DESCRIPTION

Figure 1:
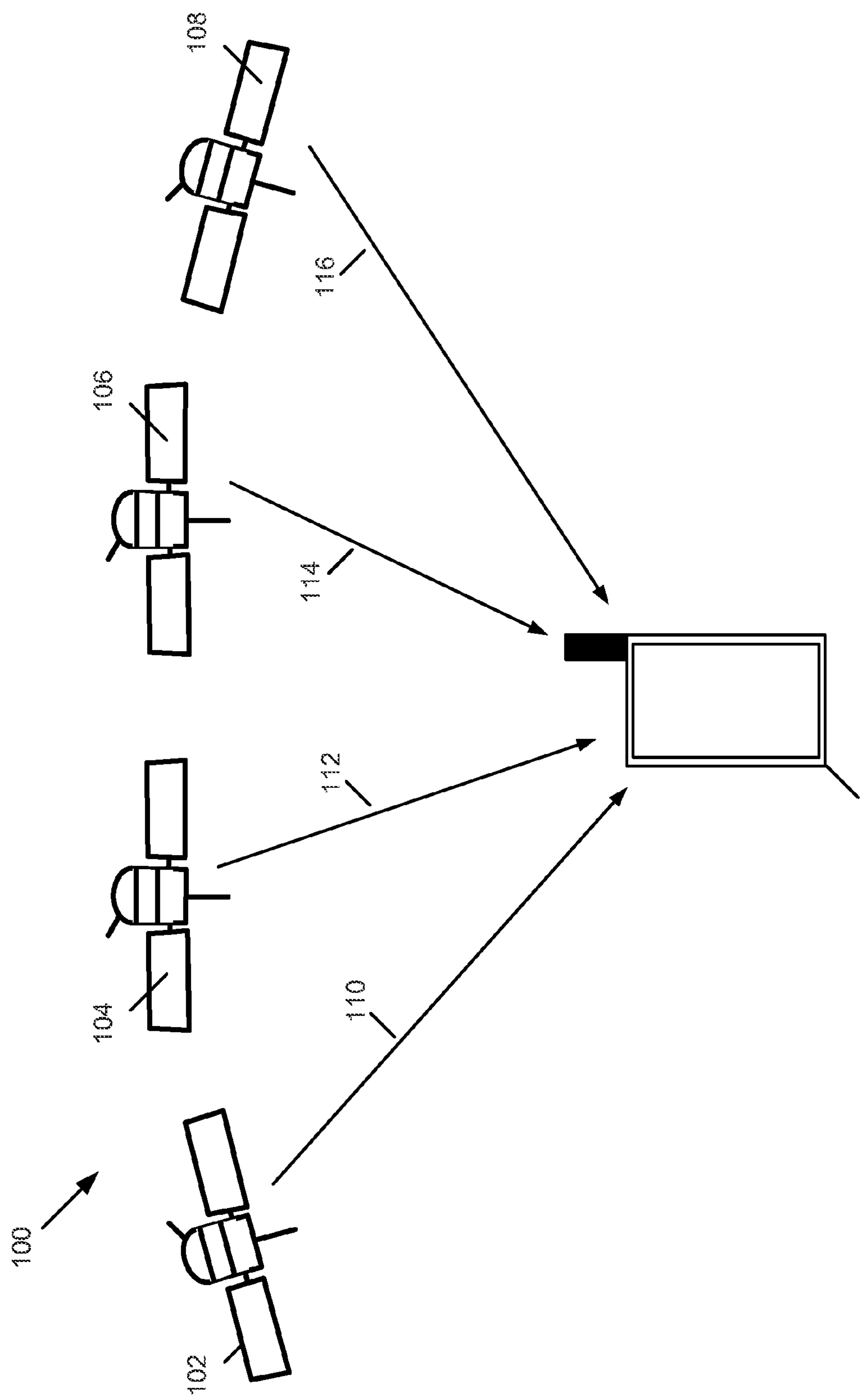
FIG. 1 is a block diagram depicting an example system for determining a position of a global positioning system (GPS) receiver.

FIG. 1 is a block diagram depicting an example system 100 for determining a position of a global positioning system (GPS) receiver 118. As shown in FIG. 1, GPS satellites (i.e., SVs) 102, 104, 106, and 108 broadcast signals 110, 112, 114, and 116, respectively, that are received by the GPS receiver 118. The GPS receiver 118 is positioned at a location somewhere relatively near the surface of the Earth. The GPS receiver 118 may be part of a personal navigation device (i.e., a PND, for example, from Garmin, TomTom, etc.) or the GPS receiver 118 may be part of a cell phone or any other device with GPS functionality.

The signals 110, 112, 114, and 116 are GPS signals well-known to those having ordinary skill in the art of GPS systems. Signals from at least four SVs are generally needed before the receiver 118 can determine its location. In most systems, to determine the location of the GPS receiver 118, the GPS receiver 118 enters into a predetermined sequence to acquire and extract the required data from each of the signals 110, 112, 114, and 116. The steps may include an acquisition step, a tracking step, a bit synchronization step, a frame synchronization step, and a navigation step. Specifically, the bit synchronization step and the frame synchronization step may be used in resolving a satellite time for each of the satellites 102, 104, 106, 108. The fully-resolved satellite time includes a second count and a bit count that are resolved after the bit synchronization and the frame synchronization are performed, respectively. The fully-resolved satellite time is also based on a sub-millisecond part (code phase) for a signal transmitted by the satellite.

In the system 100 of FIG. 1, however, the location of the GPS receiver 118 is determined without performing the bit synchronization and frame synchronization in the GPS receiver 118. Thus, in the system 100, the location of the GPS receiver 118 is determined without a fully-resolved satellite time. As explained in further detail below, the location of the GPS receiver 118 is determined based on a receiver time estimation, valid ephemeris for a plurality of satellites that are visible to the receiver 118, and an estimation of the receiver's location.

Specifically, to determine the location of the receiver 118 in the system 100 of FIG. 1, a position of the GPS receiver 118 is estimated, where the estimated position is associated with an estimated receiver time. A first satellite and a second satellite that are visible to the receiver 118 are identified. For each of the first satellite and the second satellite, data is received and used to determine a satellite position and a code phase for a transmitted satellite signal. A relative code phase between the transmitted satellite signals of the first satellite and the second satellite is calculated, where the relative code phase is a difference between the code phases. A satellite time for each of the first satellite and the second satellite is determined via calculations, where the calculations are based on the estimated position of the GPS receiver 118, the estimated receiver time, and the satellite positions of the first and second satellites. The location of the GPS receiver 118 is determined by solving an equation based on the calculated satellite times for the first and second satellites and the relative code phase.

Using this method of determining the location of the GPS receiver 118, the location is determined prior to a bit synchronization and a frame synchronization in the GPS receiver 118. The method may take advantage of the slow and stable code phase movement between the first and second satellites, where the slow and stable code phase movement is a result of the fact that the satellite signals are synchronized with the GPS time system and the fact that the code Doppler (caused by SV and receiver relative movement) is relatively small, as compared to the carrier Doppler (e.g., less than 5 chips/second). The relative code phase may be equal to approximately a few chips per second, depending on the Doppler difference between the satellites. In accordance with this method, if a correct tracking code phase is determined, the change or increment of the relative code phase between two received satellite signals can be predicted a few seconds away. Alternatively, a second-level time change can be resolved based on the change or increment of the relative code phases at two time points.

Figure 2:
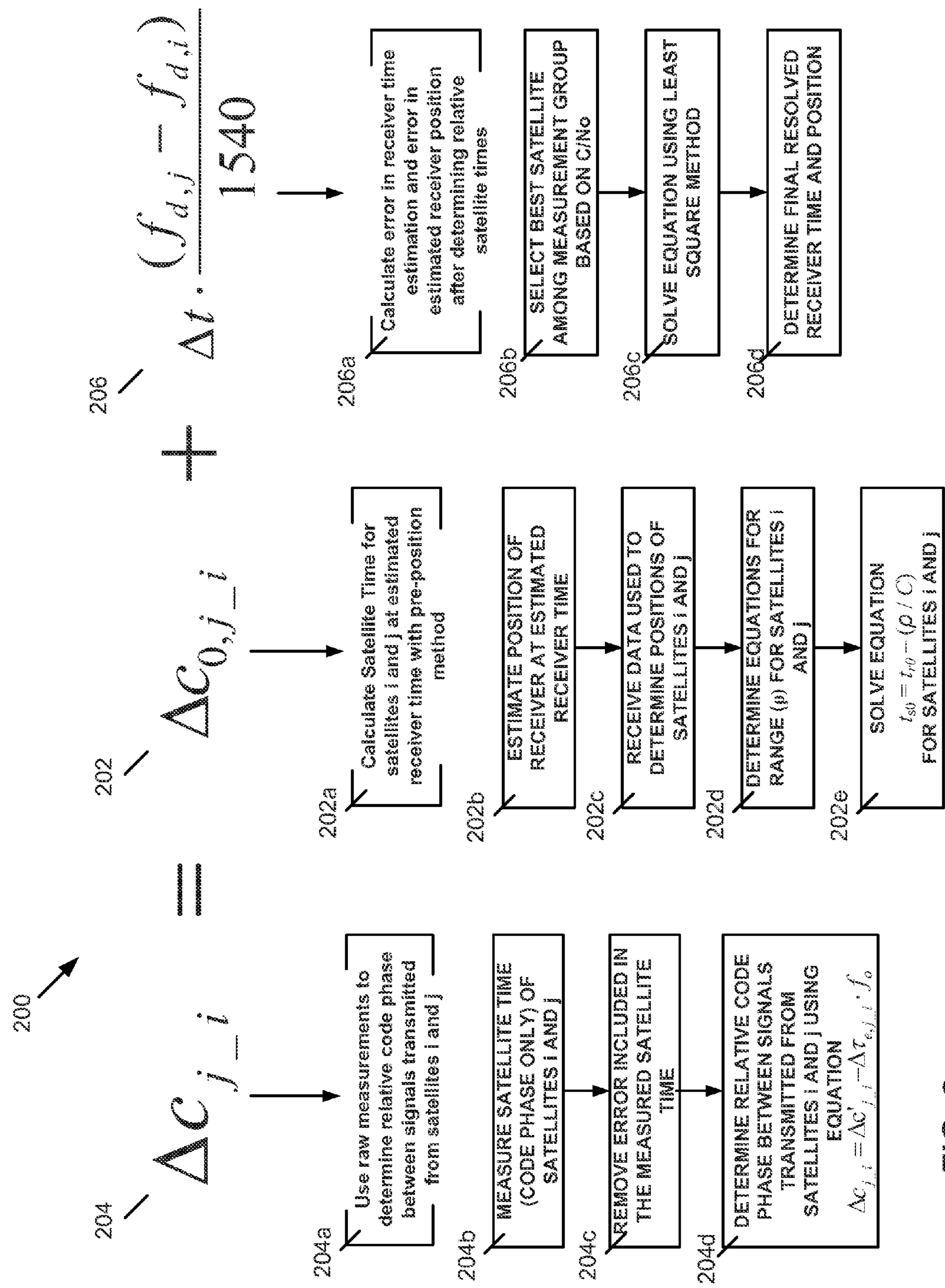
FIG. 2 depicts an equation that is solved to determine a position of a GPS receiver without performing a bit synchronization and a frame synchronization in the GPS receiver.

FIG. 2 depicts an equation 200 that is solved to determine a position of a GPS receiver without performing a bit synchronization and a frame synchronization in the GPS receiver. In describing FIG. 2, the following definitions and terminology are used:

$\Delta t$: receiver time estimation error;

$(\Delta x, \Delta y, \Delta z)$: receiver location estimation error;

$(x, y, z)$: target or true receiver location;

$(x_{s,i}, y_{s,i}, z_{s,i})$: accurate position of satellite SVi;

$(x_0, y_0, z_0)$ : receiver location estimation;

$f_0$: nominal code rate, 1.023 e6 chips/second;

$L_1$: nominal L1 carrier frequency, 1575.42 e6 Hz;

$f_{d,i}$: carrier Doppler of satellite SVi;

$t_r$ : target or true receiver time;

$t_{r0}$: estimated receiver time;

$t_{s,i}$: satellite time of SVi at the target or true receiver time, in units of seconds;

$t_{s0,i}$: satellite time of SVi at the estimated receiver time, in units of seconds;

$c_i$: satellite time of SVi at the target or true receiver time, in units of chips;

$c_{0,1}$: satellite time of SVi at the estimated receiver time, in units of chips;

$\Delta c_{j\_i}$: relative satellite time between SVj and SVi at the target or true receiver time, in units of chips;

$\Delta c_{0,j\_i}$: relative satellite time between SVj and SVi at the estimated receiver time, in units of chips;

C: speed of light, 2.99792458 e8 meters/second;

$\rho_i$: range between SVi and the GPS receiver;

$c'_i$: measured satellite time of SVi from raw measurement; and $\tau_{e,i}$: composite error included in the raw measurement.

For normal application scenarios, GPS satellite signal propagation can be written as:

$$c_i = c_{o,i} + \Delta t \cdot \left(f_o + \frac{f_{d,i}}{1540}\right), \tag{1}$$

where $c_i$ is a satellite time for satellite SVi at a target or true receiver time, in units of chips; $c_{o,i}$ is a satellite time for the satellite SVi at an estimated receiver time, in units of chips; $f_{d,i}$ is the carrier Doppler of the satellite SVi, in units of Hz; $f_o$ is the nominal code rate, 1.023 e6 chips/second; and $\Delta t$ is an error in the estimated receiver time, in units of seconds. If the satellite SVi is considered to be a base reference satellite, then a relative satellite time between a second satellite, SVj, and the base, reference satellite, SVi, is described by the equation 200 of FIG. 2, reproduced below as Equation (2):

$$\Delta c_{j\_i} = \Delta c_{0,j\_i} + \Delta t \cdot \frac{(f_{d,j} - f_{d,i})}{1540}, \tag{2}$$

where $\Delta c_{0,j\_i}$ (depicted at 202 of FIG. 2) is equal to $c_{o,j}-c_{o,j}$, and $\Delta c_{j\_i}$ (depicted at 204) is equal to $c_j-c_i$. $\Delta c_{0,j\_i}$ and $\Delta c_{j\_i}$ are relative satellite times at two time points, both in units of chips. As described in further detail below, the relative satellite time $\Delta c_{j\_i}$ may be equivalent to the relative code phase between satellite signals transmitted by the satellites SVj and SVi.

Equation (2) describes a relative satellite time propagation model. From Equation (2), the relative satellite time at the target or true receiver time $\Delta c_{j\_i}$ and the time interval $\Delta t$ can be resolved mutually. Further, because the relative satellite time increment is on the order of a few chips per second, neither the integer ms part nor the higher level parts of the satellite time need to be considered, allowing the time interval $\Delta t$ and location estimation error $(\Delta x, \Delta y, \Delta z)$ to be determined with only a code phase part of the satellite time measurement, without waiting for a bit synchronization and a frame synchronization to be performed.

As depicted at 202*a*, the relative satellite time at the estimated receiver time $\Delta c_{0,j\_i}$ is determined by calculating a satellite time for satellites SVi and SVj at the estimated receiver time using a pre-position form of satellite time. As depicted at 204*a*, the relative satellite time at the target or true receiver time $\Delta c_{j\_i}$ is determined by using raw measurements to determine the relative code phase between signals transmitted from satellites SVi and SVj. The satellite time determined using the raw measurements includes various errors that are accounted for, as described below. As depicted at 206*a*, the error in the receiver time estimation $\Delta t$ and the error in the estimated receiver position $(\Delta x, \Delta y, \Delta z)$ are calculated after determining the relative satellite times $\Delta c_{0,j\_i}$ and $\Delta c_{j\_i}$. The method for determining each of $\Delta c_{0,j\_i}$ (202), $\Delta c_{j\_i}$ (204), and $$\Delta t \cdot \frac{(f_{d,j} - f_{d,i})}{1540} (206)$$

in the equation 200 of FIG. 2 are described in greater detail below.

The relative satellite time at the estimated receiver time, $\Delta c_{0,j\_i}$ (202), is determined by calculating a satellite time for satellites SVi and SVj at the estimated receiver time using a pre-position form of satellite time. The pre-position form of satellite time is calculated according to an equation:

$$t_{s0,i}=C_{o,i}/f_0=t_{r0}-\rho_i/C, \quad (3)$$

where $t_{s0,i}$ is the satellite clock time of satellite SVi at the estimated receiver time, in units of seconds; $c_{o,i}$ is the satellite time of satellite SVi at the estimated receiver time, in units of chips; $f_0$ is the nominal code rate of 1.023 e6 chips/second; $t_{r0}$ is the estimated receiver time, in units of seconds; $\rho_i$ is the range between satellite SVi and the receiver, in units of meters; and C is the speed of light, in meters per second. The satellite clock time can be represented in different forms that are equivalent:

$$c=t_s \cdot f_o \quad (4)$$

The pre-position form of satellite time uses a satellite position and a receiver position estimation to calculate the range between the satellite and the receiver. Using the calculated range, the satellite time can be predicted with Equation (3). The pre-position method to determine $\Delta c_{0,j\_i}$ is described in FIG. 2 at steps 202*b*, 202*c*, 202*d*, and 202*e*. At 202*b*, the location of the receiver is estimated at the estimated receiver time. The estimated receiver location at the estimated receiver time is $(x_0, y_0, z_0)$, the estimated receiver time is $t_{r0}$, the error in the estimated receiver location is $(\Delta x, \Delta y, \Delta z)$, the error in the estimated receiver time is $\Delta t$, the true receiver location is (x, y, z), and the true receiver time is $t_r$, resulting in the following relationships:

$$x_o+\Delta x$$

$$y=y_0+\Delta y$$

$$z=z_0+\Delta z$$

$$t_r=t_{r0}+\Delta t \quad (5)$$

The error in the estimated receiver location $(\Delta x, \Delta y, \Delta z)$ is used in the pre-position satellite time derivation and is resolved together with the error in the estimated receiver time $\Delta t$ as described below.

At 202*c*, data is received to determine the positions of the satellites SVi and SVj. In FIG. 2, the received data is valid ephemeris data received from the satellites SVi and SVj. Using the receiver time estimation $t_{r0}$ and the valid ephemeris data, the accurate satellite position $(x_s, y_s, z_s)$ is calculated at the estimated receiver time $t_{r0}$. At 202*d*, equations for the ranges (i.e., the distance from the satellite to the receiver) for satellites SVi and SVj can be determined with the true receiver location (x, y, z) in Equation (5) according to:

$$\rho_i=\sqrt{(x_{s,i}-x)^2+(y_{s,i}-y)^2+(z_{s,i}-z^2}$$

$$\rho_i=\sqrt{(x_{s,i}-x_0-\Delta x)^2+(y_{s,i}-y_0-\Delta y)^2+(z_{s,i}-z_0-\Delta z)^2} \quad (6)$$

Equation (6) can be transformed into a linear equation using a Tyler serials expansion method as follows:

$$\rho_i = r_i + \frac{-(x_{s,i}-x_0)}{r_i}\cdot\Delta x + \frac{-(y_{s,i}-y_0)}{r_i}\cdot\Delta y + \frac{-(z_{s,i}-z_0)}{r_i}\cdot\Delta z + O(\Delta x, \Delta y, \Delta z), \quad (7)$$

where $r_i=\sqrt{(x_{s,i}-x_0)^2(y_{s,i}-y_0)^2+(z_{s,i}-z_0)^2}$ is the estimated range for SVi;

$$\left(\frac{-(x_{s,i}-x_0)}{r_i}, \frac{-(y_{s,i}-y_0)}{r_i}, \frac{-(z_{s,i}-z_0)}{r_i}\right)$$

is the direction cosine for SVi; and $O(\Delta x, \Delta y, \Delta z)$ is the higher order infinite small of $(\Delta x, \Delta y, \Delta z)$, which is expected to converge to zero in the final solution of the equations, such that the term is ignored in the derivation.

At 202*e*, Equation (3), $t_{s0,i}=c_{o,i}/f_0=t_{r0}-\rho_i/C$, is solved for satellites SVi and SVj to determine the calculated satellite times. Equation (7) is substituted into Equation (3) to produce the calculated pre-position satellite time for satellite SVi:

$$\frac{c_{0,i}}{f_o} = t_{r0} - \left(r_i + \frac{-(x_{s,i}-x_0)}{r_i}\cdot\Delta x + \frac{-(y_{s,i}-y_0)}{r_i}\cdot\Delta y + \frac{-(z_{s,i}-z_0)}{r_i}\cdot\Delta z\right)\cdot\frac{1}{C} \quad (8)$$

The calculated pre-position satellite time for satellite SVj can similarly be represented as follows:

$$\frac{c_{0,j}}{f_o} = t_{r0} - \left(r_j + \frac{-(x_{s,j}-x_0)}{r_j}\cdot\Delta x + \frac{-(y_{s,j}-y_0)}{r_j}\cdot\Delta y + \frac{-(z_{s,j}-z_0)}{r_j}\cdot\Delta z\right)\cdot\frac{1}{C} \quad (9)$$

From Equations (8) and (9), the relative satellite time at the estimated receiver time $\Delta c_{0,j\_i}$ (as depicted at 202 of FIG. 2) is determined:

$$\Delta c_{0,j\_i} = \left(\frac{-(x_{s,i}-x_0)}{r_i} - \frac{-(x_{s,j}-x_0)}{r_j}\right)\frac{f_o}{C}\cdot\Delta x + \left(\frac{-(y_{s,i}-y_0)}{r_i} - \frac{-(y_{s,j}-y_0}{r_j}\right)\frac{f_o}{C}\cdot\Delta y + \left(\frac{-(z_{s,i}-z_0)}{r_i} - \frac{-(z_{s,j}-z_0)}{r_j}\right)\frac{f_o}{C}\cdot\Delta z + (r_i - r_j)\frac{f_o}{C} \quad (10)$$

The relative satellite time at the target or true receiver time $\Delta c_{j\_i}$ (204) is determined using raw measurements of satellite time to determine the relative code phase between signals transmitted from satellites SVi and SVj. Because the relative satellite time increments or changes very slowly, a code phase portion of the satellite time measurement is used, and other portions of the satellite time measurement are ignored. Thus, at 204*b*, a code phase portion of the satellite time is measured for satellites SVi and SVj.

At 204*c*, an error included in the measured satellite time is removed. The satellite time measurement includes errors, including a) SV introduced errors (e.g., SV clock bias, group delay, relativistic effect, SV position extrapolation), b) propagation path introduced errors (e.g., troposphere, ionosphere), and c) receiver introduced errors (e.g., receiver clock drift). The most serious of the errors may be the SV clock bias error, which may be, for example, hundreds of chips between two satellites, resulting in hundreds of seconds of time interval error. The SV clock bias can be calculated via ephemeris parameters and removed from the satellite time measurement.

The pure satellite time at the target or true receiver time $c_i$ based on the raw measurement is as follows:

$$c_i=c'_i-\tau_{e,i}\cdot f_0, \quad (11)$$

where $c'_i$ is the measured satellite time (code phase only) of SVi from the raw measurement, in units of chips, and $\tau_{e,i}$ is the composite error included in the measured satellite time, in units of seconds.

At 204*d*, the relative satellite time at the target or true receiver time is determined by solving the following equation:

$$\Delta c_{j\_i}=\Delta c'_{j\_i}-\Delta\tau_{e,j\_i}\cdot f_o, \quad (12)$$

where $\Delta c_{j\_i}=c_j-c_i$, $\Delta c'_{j\_i}=c'_j-c'_i$, and $\Delta\tau_{e,j\_i}=\tau_{e,j}-\tau_{e,i}$. In Equation (12), the relative satellite time at the target or true receiver time $\Delta c_{j\_i}$ is the relative code phase between signals transmitted from the satellites SVi and SVj, due to the fact that only the code phase portion of the satellite time measurement is used in the above method.

The error in the estimated receiver time Δt included in the term $$\Delta t\cdot\frac{(f_{d,j}-f_{d,i})}{1540}(206)$$

and the error in the estimated receiver position (Δx, Δy, Δz) are calculated after determining the relative satellite times $\Delta c_{0,j\_i}$ and $\Delta c_{j\_i}$. The relative satellite times $\Delta c_{0,j\_i}$ and $\Delta c_{j\_i}$ are determined as described above, resulting in Equations (10) and (12), respectively. Equations (10) and (12) are substituted into Equation (2) to produce the following expression:

$$\left(\frac{-(x_{s,i}-x_0)}{r_i}-\frac{-(x_{s,j}-x_0}{r_j}\right)\frac{f_o}{C}\cdot\Delta x+\left(\frac{-(y_{s,i}-y_0)}{r_i}-\frac{-(y_{s,j}-y_0}{r_j}\right)\frac{f_o}{C}\cdot\Delta y+\left(\frac{-(z_{s,i}-z_0)}{r_i}-\frac{-(z_{s,j}-z_0)}{r_j}\right)\frac{f_o}{C}\cdot\Delta z+(r_i-r_j)\frac{f_o}{C}+\frac{(f_{d,j}-f_{d,i})}{1540}\cdot\Delta t=\Delta c'_{j\_i}-\Delta\tau_{e,j\_i}\cdot f_o \quad (13)$$

Equation (13) is rewritten as follows:

$$\left(\frac{-(x_{s,i}-x_0)}{r_i}-\frac{-(x_{s,j}-x_0)}{r_j}\right)\cdot\Delta x+\left(\frac{-(y_{s,i}-y_0)}{r_i}-\frac{-(y_{s,j}-y_0)}{r_j}\right)\cdot\Delta y+\left(\frac{-(z_{s,i}-z_0)}{r_i}-\frac{-(z_{s,j}-z_0)}{r_j}\right)\cdot\Delta z+\frac{(f_{d,j}-f_{d,i})}{L_1}C\cdot\Delta t=\frac{C}{f_o}\Delta c'_{j\_i}-\Delta\tau_{e,j\_i}+(r_j-r_i), \quad (14)$$

where $L_1$=1575.42 MHz is the nominal GPS L1 RF carrier frequency and $\Delta\tau_{e,j\_i}$ is the relative$_j$ composite error included in the raw measurement, in units of meters.

At 206*b*, the best satellite among the measurement group (i.e., the satellites visible to the receiver) is selected as the base reference satellite. The satellite may be selected as being the best based on a C/No measurement. If N raw measurements are made, there are (N−1) equations as Equation (14). At 206*c*, the (N−1) equations as Equation (14) are solved using a Least Square method to resolve the error in the estimated receiver time Δt and the error in the estimated receiver location (Δx, Δy, Δz) when N≥5. At 206*d*, the final resolved receiver time and position are determined.

In solving Equation (14) using the Least Square method, the following equations are used:

$$x=(\Delta x,\Delta y,\Delta z,\Delta t)^T \quad (15)$$

$$h_i=\left(\frac{-(x_{s,i}-x_0)}{r_i},\ \frac{-(y_{s,i}-y_0)}{r_i},\ \frac{-(z_{s,i}-z_0)}{r_i},\ \frac{-f_{d,i}}{L_1}C\right) \quad (16)$$

$$H_e=\begin{bmatrix}h_0-h_1\\ h_0-h_2\\ h_0-h_3\\ \vdots\\ h_0-h_{N-1}\end{bmatrix} \quad (17)$$

$$p_e=\begin{bmatrix}(C/f_o)\Delta c'_{1\_0}-\Delta\tau_{e,1\_0}+(r_1-r_0)\\ (C/f_o)\Delta c'_{2\_0}-\Delta\tau_{e,2\_0}+(r_2-r_0)\\ (C/f_o)\Delta c'_{3\_0}-\Delta\tau_{e,3\_0}+(r_3-r_0)\\ \vdots\\ (C/f_o)\Delta c'_{(N-1)\_0}-\Delta\tau_{e,(N-1)\_0}+(r_{N-1}-r_0)\end{bmatrix} \quad (18)$$

$$H_e x=p_e \quad (19)$$

The Least Square solution can be represented as follows:

$$x-(H_e^TH_e)^{-1}H_e^Tp_e \quad (20)$$

In constructing Equation (19), the relative code phase change (i.e., the $p_e$ element) should be within (−512, +512) and, thus, an ms rollover check may be performed. In performing the ms rollover check, only the sub ms part is needed, since the relative code phase change plus the pre-position range uncertainty should be small (e.g., in the range of dozens of chips). The resolved true receiver time, $t_r=t_{r0}+\Delta t$, should have week rollover check.

In applying the method described above in FIGS. 1 and 2, the receiver time estimation error Δt should not be too large. Rather, the receiver time estimation error should be only a second level time error (e.g., just a few seconds). If the receiver time estimation error is too large, the Doppler may not be taken as a constant, and aspects of the described method may produce inaccurate results.

Figure 3:
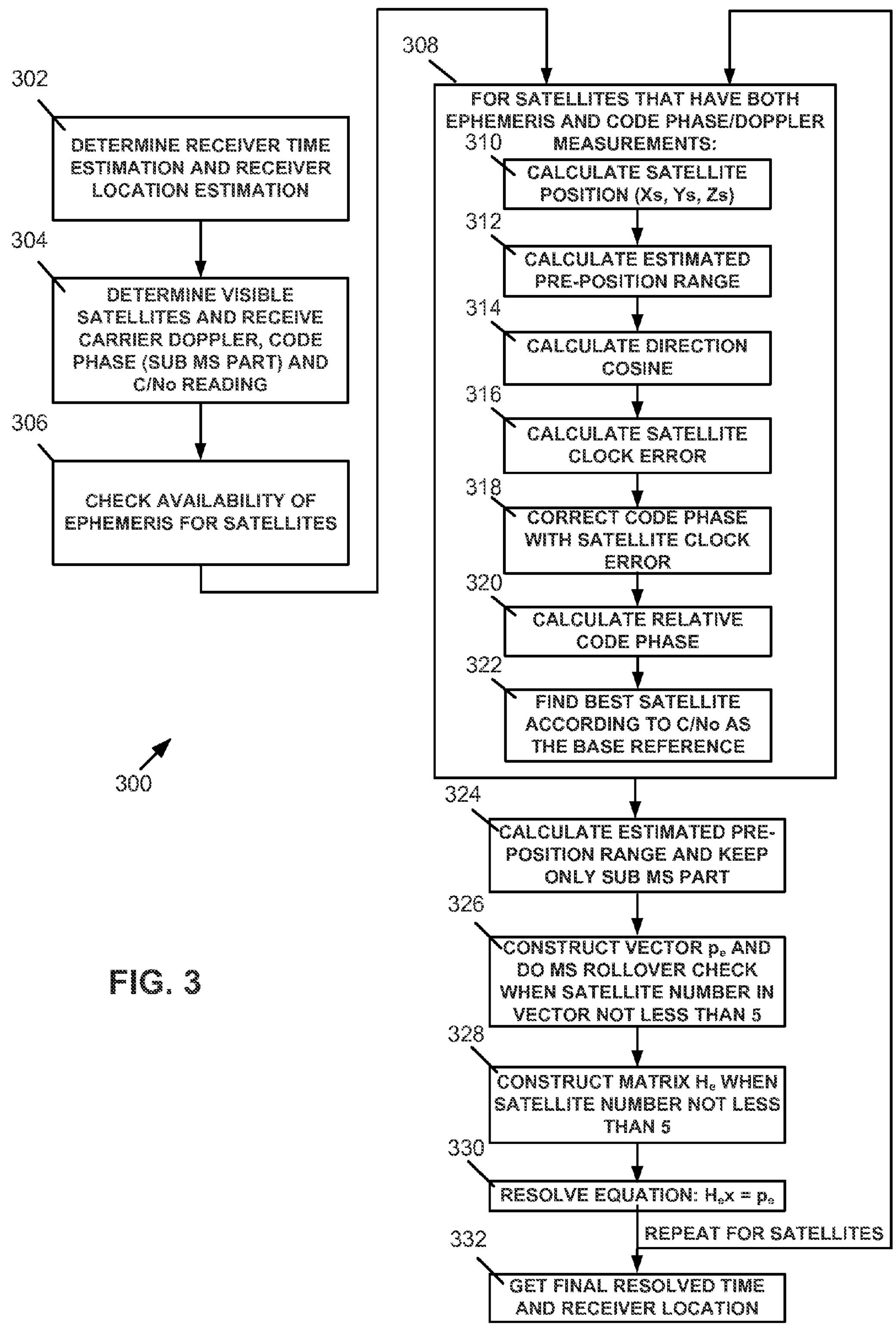
FIG. 3 is a flowchart illustrating an example method for determining a position of a GPS receiver based on valid ephemeris from satellites visible to the GPS receiver and an estimation of receiver time and receiver location.

FIG. 3 is a flowchart 300 illustrating an example method for determining a position of a GPS receiver based on valid ephemeris from satellites visible to the GPS receiver and an estimation of receiver time and receiver location. At 302, a receiver time estimation and a receiver location estimation are determined. At 304, satellites visible to the GPS receiver are determined, and carrier Doppler, code phase (sub ms part), and C/No data are received. At 306, the availability of ephemeris for the visible SVs is determined. At 308, for those SVs that have both ephemeris and code phase/Doppler measurements, steps 310-322 are performed. At 310, SV position (Xs, Ys, Zs) is calculated. At 312, an estimated pre-position range is calculated. At 314, a direction cosine is calculated. At 316, a satellite clock error is calculated. At 318, the code phase with the satellite clock error is corrected. At 320, the relative code phase is calculated. At 322, the best satellite is determined according to the C/No reading and chosen as a base reference satellite.

At 324, the estimated pre-position range is calculated, and the sub ms part is kept from the calculated range. At 326, vector Pe is constructed, and an ms rollover check is performed when the satellite number in the vector is not less than five. At 328, matrix He is constructed when the satellite number is not less than five. At 330, the equation $H_e x=P_e$ is resolved, and steps 310-328 are repeated for all satellites, as necessary. At 332, the final resolved receiver time and receiver location are determined.

Figure 4:
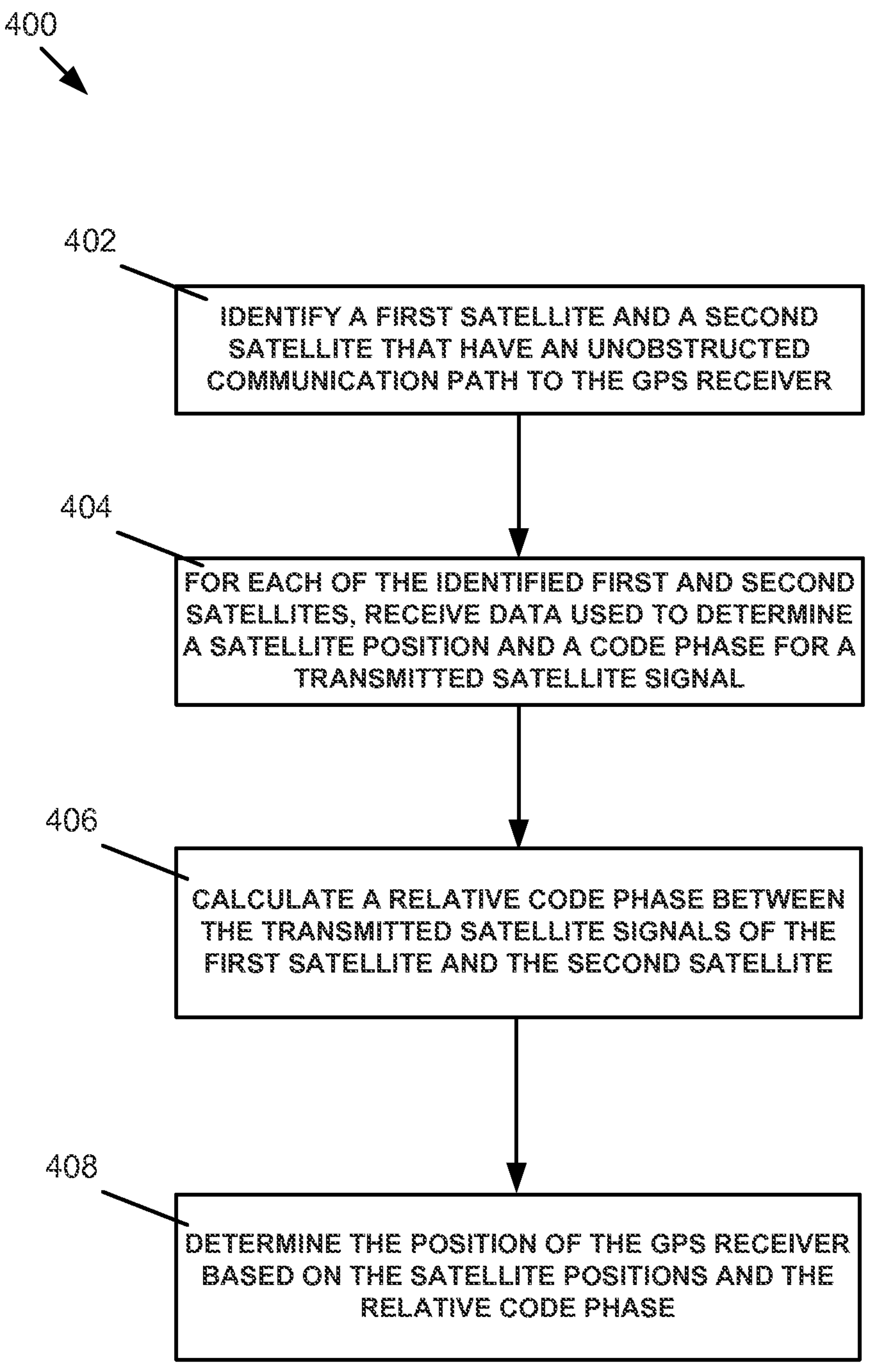
FIG. 4 is a flowchart illustrating an example method for determining a position of a global positioning system (GPS) receiver.

FIG. 4 is a flowchart 400 illustrating an example method for determining a position of a global positioning system (GPS) receiver. At 402, a first satellite and a second satellite that have an unobstructed communication path to the GPS receiver are identified. At 404, for each of the identified first and second satellites, data is received to determine a satellite position and a code phase for a transmitted satellite signal. At 406, a relative code phase between the transmitted satellite signals of the first satellite and the second satellite is calculated. The relative code phase is a difference between the determined code phases. At 408, the position of the GPS receiver is determined based on the satellite positions of the first and the second satellites and the relative code phase.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method for determining a position of a global positioning system (GPS) receiver, the method comprising:

identifying a first satellite and a second satellite that have an unobstructed communication path to the GPS receiver, and receiving data used to determine:

a satellite position for each of the first satellite and the second satellite, and a code phase for a transmitted satellite signal for each of the first satellite and the second satellite;

calculating a relative code phase between the transmitted satellite signals of the first satellite and the second satellite, the relative code phase being a difference between the determined code phases;

estimating a position of the GPS receiver, the estimated position being associated with an estimated receiver time;

calculating a satellite time for each of the first satellite and the second satellite, the calculating being based on the estimated position of the GPS receiver at the estimated receiver time and the satellite positions of the first satellite and the second satellite; and solving an equation based on the calculated satellite times and the relative code phase to determine a position of the GPS receiver.

2. The method of claim 1, further comprising:

calculating the satellite time for each of the first satellite and the second satellite, wherein the satellite time is calculated according to a second equation:

$$t_{s0,i}=t_{r0}-(\rho_{i/C}),$$

where $t_{s0,i}$ is the satellite time for the first satellite or the second satellite, $t_{r0}$ is the estimated receiver time, $\rho_i$ is a range between the first satellite or the second satellite and the GPS receiver, and C is the speed of light.

3. The method of claim 1, further comprising:

solving the equation based on the calculated satellite times and the relative code phase, wherein the equation is $$\Delta c_{j\_i} = \Delta c_{0,j\_i} + \Delta t \cdot \frac{(f_{d,j} - f_{d,i})}{1540},$$

where $\Delta c_{ji}$ is the relative code phase, $\Delta c_{0,j\_i}$ is a difference between the calculated satellite times of the first satellite and the second satellite, $\Delta t$ is an error in the estimated receiver time, and $(f_{d,j}-f_{d,i})$ is a difference in a carrier Doppler between the first satellite and the second satellite.

4. The method of claim 1, further comprising:

solving the equation using a least square method or a weighted least square method.

5. The method of claim 1, further comprising:

calculating the relative code phase between the transmitted satellite signals of the first satellite and the second satellite, wherein the relative code phase corresponds to a relative satellite time at a target time, wherein the relative satellite time is equal to a difference in satellite times for the first and the second satellites at the target time, and wherein the target time is equal to the estimated receiver time summed with a time estimation error.

6. The method of claim 1, further comprising:

receiving data used to determine the code phases for the transmitted satellite signals, wherein the receiving includes a measurement of the satellite time for each of the first and the second satellites; and removing an error from each of the measured satellite times.

7. The method of claim 6, further comprising:

removing the error from each of the measured satellite times, wherein the error is based on a satellite clock error.

8. The method of claim 1, further comprising:

determining the position of the GPS receiver without determining a fully-resolved satellite time wherein the position is determined without determining second count and bit count portions of a satellite time measurement.

9. The method of claim 1, further comprising:

determining the position of the GPS receiver without performing a bit synchronization and without performing a frame synchronization in the GPS receiver.

10. A global positioning system (GPS) receiver, the GPS receiver comprising:

a processor; and a computer-readable memory encoded with instructions for commanding the processor to execute steps including:

identifying a first satellite and a second satellite that have an unobstructed communication path to the GPS receiver, and receiving data used to determine:

a satellite position for each of the first satellite and the second satellite, and a code phase for a transmitted satellite signal for each of the first satellite and the second satellite;

calculating a relative code phase between the transmitted satellite signals of the first satellite and the second satellite, the relative code phase being a difference between the determined code phases;

estimating a position of the GPS receiver, the estimated position being associated with an estimated receiver time;

calculating a satellite time for each of the first satellite and the second satellite, the calculating being based on the estimated position of the GPS receiver at the estimated receiver time and the satellite positions of the first satellite and the second satellite; and solving an equation based on the calculated satellite times and the relative code phase to determine a position of the GPS receiver.

11. The GPS receiver of claim 10, wherein the steps further include:

calculating the satellite time for each of the first satellite and the second satellite, wherein the satellite time is calculated according to a second equation:

$$t_{s0,i}=t_{r0}-(\rho_i/C),$$

where $t_{s0,i}$ is the satellite time for the first satellite or the second satellite, $t_{r0}$ is the estimated receiver time, $\rho_i$ is a range between the first satellite or the second satellite and the GPS receiver, and C is the speed of light.

12. The GPS receiver of claim 10, wherein the equation is $$\Delta c_{j\_i} = \Delta c_{0,j\_i} + \Delta t \cdot \frac{(f_{d,j} - f_{d,i})}{1540},$$

where $\Delta c_{j\_i}$ is the relative code phase, $\Delta c_{0,j\_i}$ is a difference between the calculated satellite times of the first satellite and the second satellite, $\Delta t$ is an error in the estimated receiver time, and $(f_{d,j}-f_{d,i})$ is a difference in a carrier Doppler between the first satellite and the second satellite.

13. The GPS receiver of claim 10, wherein the equation is solved using a least square method or a weighted least square method.

14. The GPS receiver of claim 10, wherein the steps further include calculating the relative code phase between the transmitted satellite signals of the first satellite and the second satellite, wherein the relative code phase corresponds to a relative satellite time at a target time, wherein the relative satellite time is equal to a difference in satellite times for the first and the second satellites at the target time, and wherein the target time is equal to the estimated receiver time summed with a time estimation error.

15. The GPS receiver of claim 10, wherein the steps further include receiving data used to determine the code phases for the transmitted satellite signals, wherein the receiving includes a measurement of the satellite time for each of the first and the second satellites; and removing an error from each of the measured satellite times.

16. The GPS receiver of claim 15, wherein the error is based on a satellite clock error.

17. The GPS receiver of claim 10, wherein the steps further include:

determining the position of the GPS receiver without determining a fully-resolved satellite time, wherein the position is determined without determining second count and bit count portions of a satellite time measurement.

18. The GPS receiver of claim 10, wherein the position is determined without performing a bit synchronization and without performing a frame synchronization in the GPS receiver.

* * * * *